United States Patent
Hauenstein

(10) Patent No.: US 7,035,799 B1
(45) Date of Patent: Apr. 25, 2006

(54) METHOD AND DEVICE FOR VOICE RECOGNITION

(75) Inventor: Alfred Hauenstein, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/555,032

(22) PCT Filed: Nov. 16, 1998

(86) PCT No.: PCT/DE98/03366

§ 371 (c)(1),
(2), (4) Date: May 22, 2000

(87) PCT Pub. No.: WO99/27524

PCT Pub. Date: Jun. 3, 1999

(30) Foreign Application Priority Data

Nov. 21, 1997 (DE) ................................. 197 51 739

(51) Int. Cl.
*G10L 17/00* (2006.01)

(52) U.S. Cl. .................... 704/246; 704/201; 704/270; 704/275

(58) Field of Classification Search ................ 704/246, 704/270, 275, 201
See application file for complete search history.

(56) References Cited

U.S. PATENT DOCUMENTS

| | | | |
|---|---|---|---|
| 4,401,851 A * | 8/1983 | Nitta | 704/248 |
| 5,164,969 A * | 11/1992 | Alley | 377/39 |
| 5,349,645 A * | 9/1994 | Zhao | 704/243 |
| 5,682,464 A | 10/1997 | Sejnoha | |
| 5,848,390 A * | 12/1998 | Matsumoto | 704/260 |
| 5,899,973 A * | 5/1999 | Bandara | 704/256 |
| 5,956,678 A * | 9/1999 | Hab-Umbach | 704/256 |

FOREIGN PATENT DOCUMENTS

| | | |
|---|---|---|
| DE | 40 29 716 A1 | 7/1991 |
| WO | WO 98/22936 | 5/1998 |

OTHER PUBLICATIONS

Ortmanns et al., "Look-Ahead Techniques for Fast Beam Search", IEEE Intern. Conference on Acoustics, Speech and Signal Processing, pp. 1783-1786.

Bocchieri, "Vector Quantization for the Efficient Computation of Continuous Density Likelihoods", Speech Processing, pp. II-692-II-695.

(Continued)

*Primary Examiner*—Vijay B. Chawan
(74) *Attorney, Agent, or Firm*—Bell, Boyd & Lloyd LLC

(57) ABSTRACT

A method and a device are set forth which make it possible to set an accuracy in a voice recognition process. To this end, system parameters of the voice recognition system are determined using an input quantity via a mapping specification, and the voice recognition system is set corresponding to the obtained values. Optionally, a voice recognition system can be adapted during operation, in order to guarantee an application-specific adaptation in a range between maximal quality in the voice recognition and optimally high speed in the execution of the voice recognition. The computer can also be set automatically in that a performance index of the computer has been determined in advance using a program provided for this purpose, which index represents a measure for the input quantity and thus guarantees an adequate operation of the voice recognition system on this computer.

11 Claims, 4 Drawing Sheets

OTHER PUBLICATIONS

Hauenstein, "Optimierung von Algorithmen und Entwurf eines Prozessors für die automatische Spracherkennung", pp. 13-26.

Hauenstein, "Optimierung von Algorithmen und Entwurf eines Prozessors für die automatische Spracherkennung", pp. 40-43.

Steinbiss et al., "Improvements in Beam Search", pp. S36-5.1-S36-5.4.

Niemöller et al., "A PC-Based Real-Time Large Vocabulary Continuous Speech Recognizer for German".

Das Prinzip der schnellen Vorauswahl ('fast match'), pp. 65-69.

\* cited by examiner

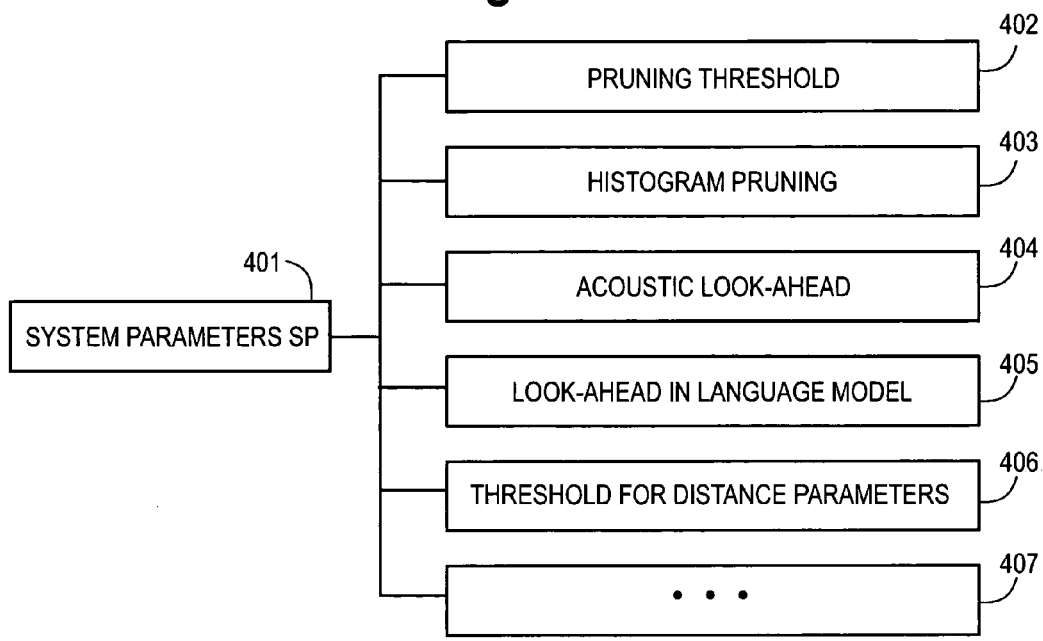
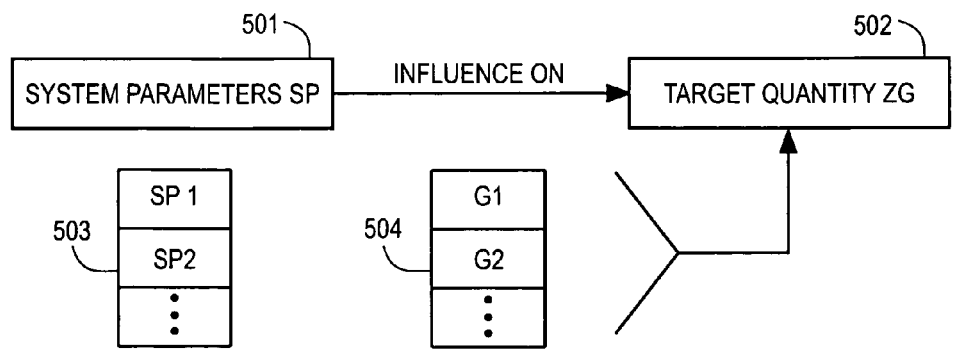

METHOD AND DEVICE FOR VOICE RECOGNITION

BACKGROUND OF THE INVENTION

1. Field of the Invention

The present invention relates to a method and a device for voice recognition.

2. Description of the Related Art

A voice recognition system is taught in the reference A. Hauenstein, "Optimierung von Algorithmen und Entwurf eines Prozessors für die automatishce Spracherkennung" This also contains a basic introduction to the components included in the voice recognition system, as well as important techniques that are common in voice recognition.

In a known voice recognition system, a degree of accuracy—that is, a measure of a quality of the recognition—is predetermined. The user must now make do with this system, even when a lower degree of accuracy would suffice for his application, though he would achieve a higher operating speed in the bargain.

The principle of pruning a search space is known from the reference A. Hauenstein, "Optimierung von Algorithmen und Entwurf eines Prozessors für die automatishce Spracherkennung" (see chapter 3.3.3, page 40). This is a matter of "trimming" the search space, or rather a method for reducing a number of search paths of the search space, whereby the least promising search paths are cut off. To this end, first a search path with minimal costs (optimal search path) is established. Then, all search paths (branches of the search tree) whose costs are above the minimum inclusive of an added prescribed evaluation quantity, which is referred to as the pruning threshold, are cut off. For a detailed explanation of the pruning: the reference A. Hauenstein, "Optimierung von Algorithmen und Entwurf eines Prozessors für die automatishce Spracherkennung", p. 40ff; particularly FIG. 16 on page 41. When a pruning threshold is used, it is not known how many search paths will remain in the search tree. If one wishes to maintain the number of these remaining search paths at a predetermined level, the pruning threshold is dynamically adapted.

A histogram pruning is taught in the references V. Steinbiss et al., "Improvements in Beam Search" and M. Niemöller et al., "A PC-based Real-Time Large Vocabulary Continuous Speech Recognizer for German". Here, a predetermined number of "best" search paths are used—that is, search paths with a high probability of occurrence—in that frequencies of the search paths are evaluated in the form of a histogram. The pruning threshold is dynamically modified.

An acoustic look-ahead in the search tree (term of art: fast look ahead) is taught in the references A. Hauenstein, "Optimierung von Algorithmen und Entwurf eines Prozessors für die automatishce Spracherkennung" and S. Ortmanns et al., "Look-Ahead Techniques for Fast Beam Search".

The idea pursued in the acoustic look-ahead (also referred to as fast preselection) is based on the characteristic of a language that all words are composed of a limited inventory of linguistic subunits (e.g. phonemes, half-syllables). An acoustic weighting is now performed for these linguistic subunits "in advance". Only those combinations of linguistic subunits are tracked whose acoustic weights are below a predetermined threshold. An advantage in the weighting outlay is that, for a low number of linguistic subunits, a measure of the agreement of a speech signal that is to be recognized, on one hand, and a target quantity, on the other hand, is computed in advance and used as a basis for deciding whether a large part of the search tree should be excluded from consideration. Simply put, this means that more search paths in the search tree are reserved than are added in by the prediction. A profit like this grows larger the higher the ratio of new word beginnings to a number of linguistic subunits becomes. This ratio increases with the number of linguistic subunits, or respectively, words, that are to be recognized (lexicon size).

An advantage of the method of acoustic look-ahead consists in the regularity of the algorithms for computing the corresponding scores. Since there are no branchings in the search space due to word ends, syntactic nodes, and so on, the schema of the calculation of the scores is regular. Exactly for this reason, it is possible to use this type of method for an implementation in hardware also.

The prediction of the scores for which is used the (term of art: fast match scores) is possible because the actual search lags behind the current extracted scores of the speech signal by a fixed number of time windows. Using the current scores, the prediction of the scores of further linguistic subunits is performed (see the reference A. Hauenstein, "Optimierung von Algorithmen und Entwurf eines Prozessors für die automatishce Spracherkennung", p. 65, FIG. 33).

This type of look-ahead is also carried out in language models (see the reference S. Ortmanns et al., "Look-Ahead Techniques for Fast Beam Search").

The principle of language model look-ahead is to take the probabilities existing in the language model into account in the search process as soon as possible, and also in the associated pruning. This is achieved by a factorization of the probabilities in the language model. A detailed description with a formal notation is contained in the reference S. Ortmanns et al., "Look-Ahead Techniques for Fast Beam Search".

Finally, a threshold for selecting computing distance parameters is taught in the reference E. Bocchieri, "Vector Quantization for the Efficient Computation of Continuous Density Likelihoods". Such selection methods are generally multi-step First, a rough calculation is performed using a part of the distances. In the next step, those distances are determined which are close to the best distance of the first computational step with respect to an interval score. This interval score can be varied via a threshold, whereby the computing outlay for determining the distance parameters is varied.

SUMMARY OF THE INVENTION

An object of the present invention is to provide a method and a device for adjusting the accuracy of the voice recognition system.

This object is achieved by the method for voice recognition, in which spoken language is recognized using a voice recognition system, whereby the voice recognition system runs on a computer; a performance index of the computer is determined by a program for computer performance assessment; an input quantity for the voice recognition system is automatically specified using the performance index; and the accuracy of the voice recognition system is automatically adjusted to the obtained computing power of the computer using this input quantity.

A method for adjusting the accuracy of a voice recognition system is set forth, in which the accuracy is determined by a prescribable input quantity. With the aid of this input quantity, values for system parameters of the voice recognition system are computed, preferably by a computer. With the aid of these values, the voice recognition system is adjusted. This is preferably accomplished by the computer automatically.

The advantage of the invention is that it makes the accuracy of the voice recognition system adaptable and at the same time adjustable to laypersons. Depending on the application, or respectively, on the computing power available for the voice recognition system on the computer, various requirements can be placed on the quality of the voice recognition system simply by adapting the input quantity.

One development consists in calculating the values for the system parameters of the voice recognition system from the input quantity in accordance with a mapping specification. This mapping specification can be converted using a table.

By setting the input quantity, it is also possible to automatically compute the values of the system parameters of the voice recognition system that are linked to these and thus to automatically make the values accessible to the voice recognition system. Filing the values in a table has the advantage that an individual adjusting of various values of the input quantity to respectively different values of the system parameters can be carried out.

Another development consists in performing the setting during the operation of the voice recognition system. The advantage of this is that the adjustment of the voice recognition system can be individually adapted according to the respective requirements during the operation of the voice recognition system.

An additional development of the invention consists in specifying at least one of the following system parameters with the aid of the input quantity:
a) pruning threshold;
b) histogram pruning;
c) acoustic look-ahead
d) language model look-ahead;
e) threshold for selecting distance parameters that are to be computed.

Refer to the introduction of this specification for the meaning and function of these system parameters.

The cited system parameters represent a selection of possibilities. There are other imaginable system parameters, which can differ from those above depending on the respective voice recognition system.

It is also a development of the invention that the system parameters are weighted in consideration of their influence on a target quantity. The target quantity can be the accuracy of the voice recognition system or a speed of the voice recognition system (i.e. the speed at which the voice recognition process is carried out). In view of the respective target quantity, the system parameters can be weighted proportionally equally or differently in accordance with a predetermined weighting table.

In the context of another development, the input quantity is specified with the aid of an adjusting element.

The adjusting element advantageously comprises a one-dimensional degree of freedom with two limits, the first limit being converted as a maximum accuracy of the voice recognition system and the second limit being converted as a maximum speed of the voice recognition system.

It is also a development of the method that the adjusting element is represented on a computer as a slider and is operated with the aid of a keyboard, a touch-pad or a mouse.

The adjusting element can also be a rotary controller, a slider or a potentiometer.

In an additional development, the adjusting element is voice activated, the speech being evaluated by a voice recognition device, particularly the voice recognition system. The input quantity can be specified by voice input.

Another development of the method is that a fully automated specifying of the input quantity is carried out in the following steps:

A performance capability of the computer on which the voice recognition system is to run is determined using a program for performance assessment and is stored as a performance index. In consideration of the performance index, the system parameters of the voice recognition system are automatically adjusted, thereby guaranteeing a high-performance voice recognition under real-time conditions, for example.

A program for determining the performance capability of the computer can be a prescribed loop, which runs through a definite number of iterations, the time for which iterations is measured. With the aid of a table, the performance index can be determined from the measured time. There are also programs that can be obtained commercially or as freeware which compute the performance of the computer and output a performance index as a rating of the performance capability.

A device for voice recognition is also set forth, which comprises a voice recognition system and which is realized with means for setting an accuracy of the voice recognition system, which means converts system parameters of the voice recognition system from an input quantity; that is, adjusts the voice recognition system and its numerous parameters with the aid of the input quantity.

It is advantageous here that such an adjusting of the system parameters with the aid of the input quantity can occur during the operation of the voice recognition system. This makes it possible for the user to easily adapt the number of system parameters.

In one development the input quantity can be specified automatically. To this end, what is known as a performance index is computed with the aid of a device for measuring the performance of the computer on which the voice detection runs, and this index is used for adjusting the accuracy of the voice recognition system.

Another development provides that the input quantity can be prescribed by an adjusting element. A variety of adjusting elements (potentiometers, virtual control units on the computer, and so on) whose setting directly determines the accuracy of the voice recognition system can be used for this.

Steps of the inventive method can expediently be carried out on the cited device.

Developments of the invention include providing that the values for the system parameters of the voice recognition system are determined in that the values are computed from the input quantity in accordance with a mapping specification. The mapping specification may be converted using a table. Preferably, the setting process is executed during the operation of the voice recognition system. According to one embodiment, the voice recognition system comprises at least one of the following system parameters: a) pruning threshold; b) histogram pruning; c) acoustic look-ahead; d) language model look-ahead; e) threshold for selecting distance parameters that are to be computed. At least one of the system parameters is specified using the input quantity. In a preferred development, the system parameters are weighted with respect to their influence on a respective target quantity. Specifically, a target quantity is at least one of the following quantities: a) accuracy of the voice recognition system; or b)

speed of the voice recognition system. The system parameters may be weighted equally. Alternately, the system parameters are weighted according to a prescribed weighting table.

As a further development of the invention a device for voice recognition is provided, including a voice recognition system, means for adjusting an accuracy of the voice recognition system, the means being so arranged that system parameters of the voice recognition system are adjustable, and the system parameters being computable using an input quantity.

BRIEF DESCRIPTION OF THE DRAWINGS

Exemplifying embodiments of the invention are detailed below with the aid of the following Figures.

FIG. 4 is a diagram representing different possible system parameters of the voice recognition system;

FIG. 5 is diagram showing the influence of the system parameters on a target quantity;

DETAILED DESCRIPTION OF THE PREFERRED EMBODIMENTS

Figure 1:
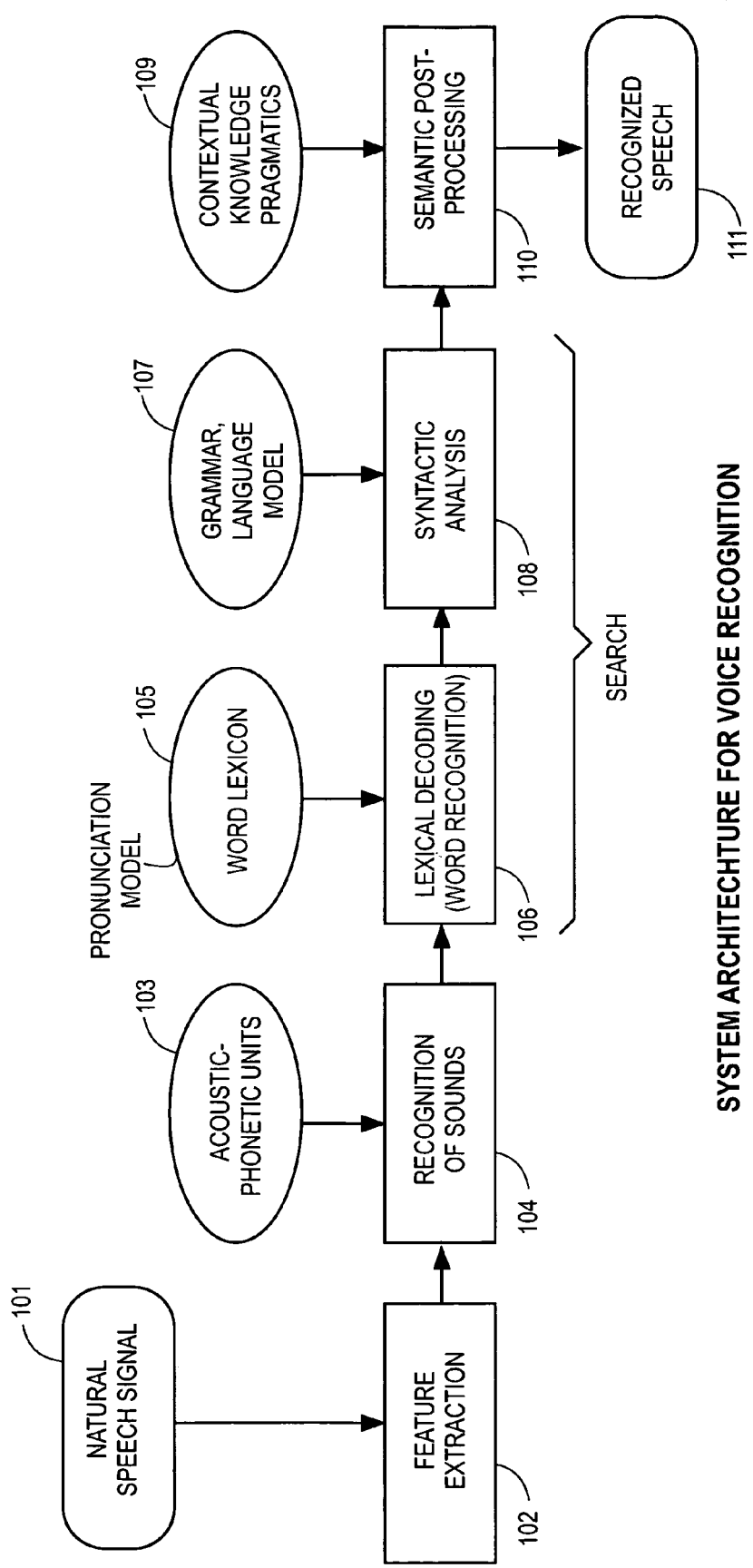
FIG. 1 is a flow chart of a system architecture for a voice recognition system.

FIG. 1 shows a system architecture for voice recognition (voice recognition system).

The recognition of naturally spoken language is predicated on an appropriate formalism for representing knowledge. A complete voice recognition system encompasses several processing levels. These include acoustics-phonetics, intonation, syntax, semantics, and pragmatics. The processing levels in the recognition are represented in FIG. 1.

The natural speech signal 101 enters the voice recognition system. There, a feature extraction is performed in a component 102. After the feature extraction, sounds are recognized with the aid of known acoustic-phonetic units 103 (see block 104). This is a matter of computing acoustic distance parameters. After the sound recognition 104, the lexical decoding (word recognition) occurs in block 106 with the aid of the pronunciation model, or respectively, word lexicon 105, and then a syntax analysis 108 with the aid of the language model 107 that encompasses the grammar. The word recognition 106 and the syntax analysis 108 represent the search for a correspondence for the speech signal. Finally, in a block 110 a semantic post-processing is performed, whereby contextual knowledge and pragmatics 109 are taken into account, and this finally results in the speech that is recognized by the voice recognition system.

Figure 2:
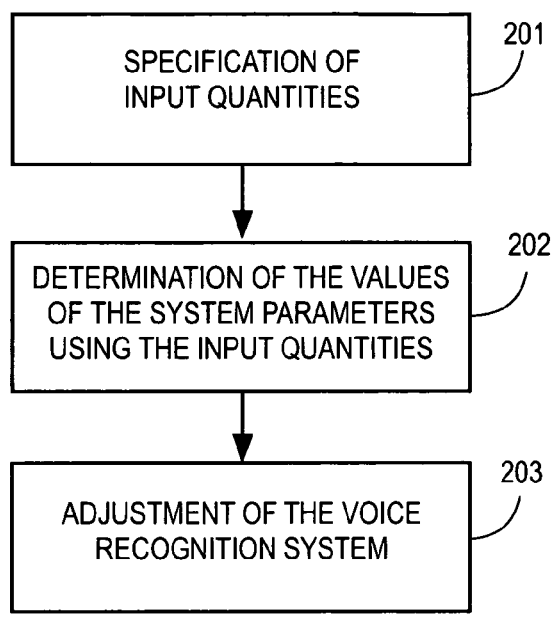
FIG. 2 is a block diagram with steps of a method for setting the accuracy of a voice recognition system.

FIG. 2 shows a block diagram representing the steps of a method for setting the accuracy of a voice recognition system.

In a step 201, the accuracy of the voice recognition system is specified by a prescribable input quantity. Next, in a step 202 values for system parameters of the voice recognition systems are computed using these input quantities. Lastly, in a step 203 the voice recognition system is adjusted using the computed values.

Figure 3:
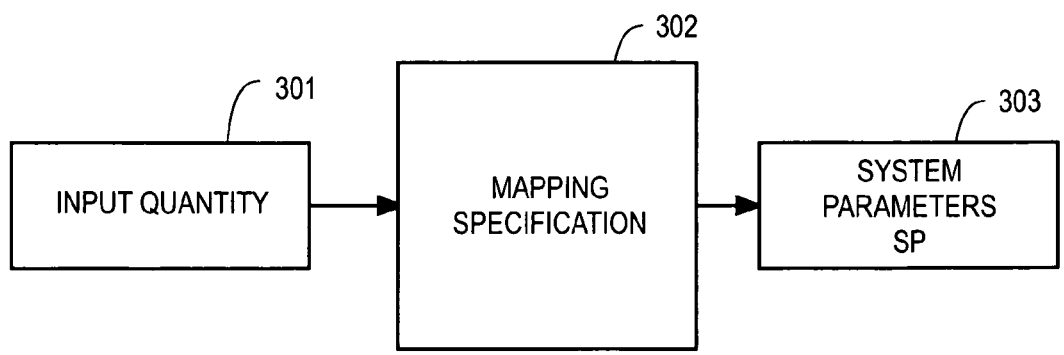
FIG. 3 is a block diagram representing a linking of an input quantity to at least one system parameter via a mapping specification.

FIG. 3 shows a block diagram representing a linking of an input quantity to at least one system parameter via a mapping specification.

The cited input quantity 301 is mapped onto the system parameters SP 303 of the voice recognition system with the aid of a mapping specification 302. One input quantity 301 is advantageously allocated to several system parameters via the mapping specification. On the basis of this mapping specification 302, the voice recognition system is adapted by specifying an input quantity; i.e., several system parameters SP are influenced by modifying one input quantity 301. The mapping specification 302 advantageously has the form of a table in which a column contains possible input quantities 301, and in a row of these columns several values for system parameters SP303 are allocated to the respective input quantity. The mapping specification 302 consists in the search for the entry (row) in the table that is allocated to the input quantity 301 and in the transfer of the found values for system parameters SP303 to the voice recognition system.

FIG. 4 shows a diagram representing different possible system parameters of the voice recognition system. The system parameters SP of the voice recognition system, represented in a block 401, include at least one of the following parameters:

a) pruning threshold 402
b) histogram pruning 403
c) acoustic look-ahead 404
d) the language model look-ahead 405
e) threshold for distance parameter 406.

Overall it is possible to imagine additional system parameters of the voice recognition system for performing a setting via the input quantity 301, indicated by the block 407.

FIG. 5 shows a sketch representing the influence of the system parameters on a target quantity.

The system parameters SP (see block 501) exert influence on a target quantity ZG (see block 502). As described above, there are several system parameters SP1, SP2, and so on, which are represented in a block 503. Here, each individual system parameter SPi (i=1, 2, . . . ) influences the target quantity ZG by means of a weight Gi that is provided for the respective system parameter SPi (represented in a block 504). By weighting the system parameters SP, it is possible to exert a variable influence on the target quantity ZG, depending on the system parameter SP.

Figure 6:
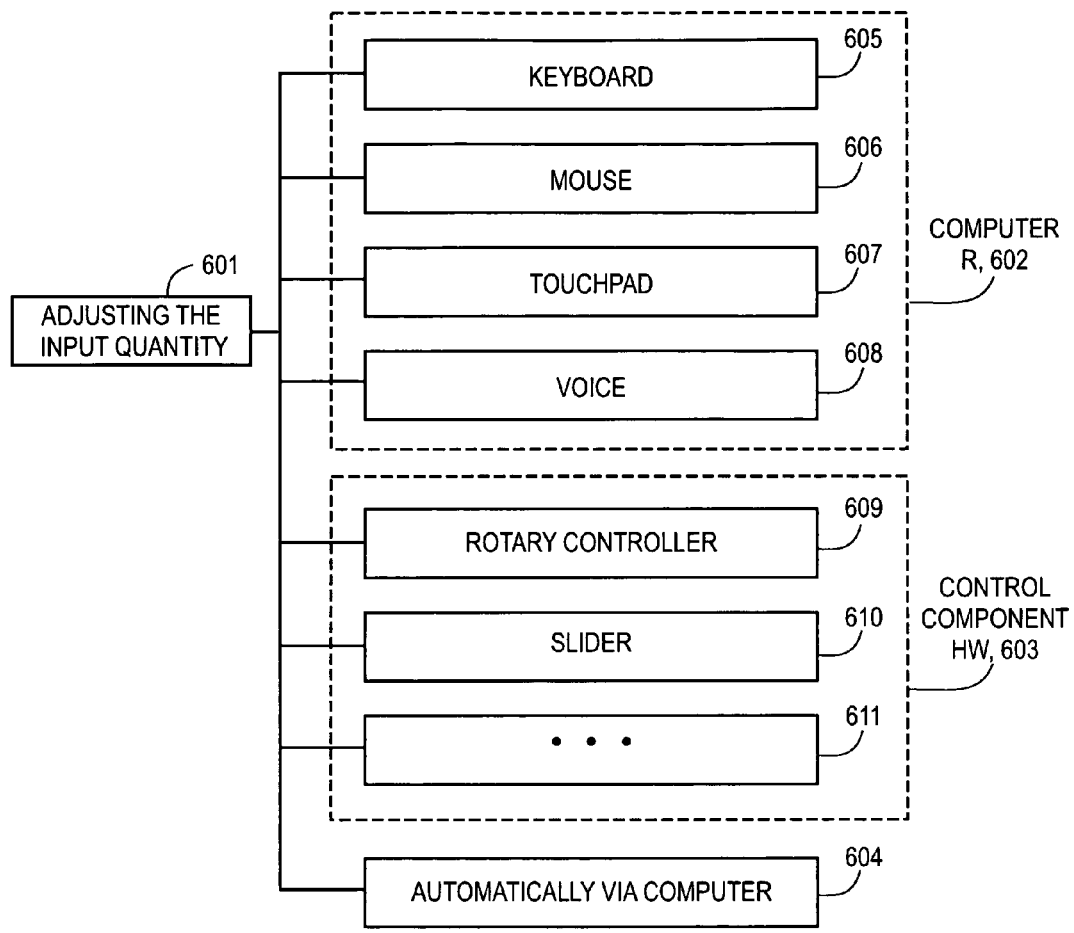
FIG. 6 a diagram showing different possibilities for adjusting the input quantity.

FIG. 6 shows a diagram representing the different possibilities for setting the input quantity. The setting of the input quantity, represented in the block 601, is accomplished using operating components of the computer R (see block 602), using control components 603, or using the computer itself (see block 604). To this end, the computer R comprises at least one means for setting the input quantity, such as a keyboard 605, a mouse 606, a touch-pad 607, or voice input 608 via the voice recognition system. Possible components for control, represented in the block 603, include a rotary control 609, a slider 610, or some other control 611, preferably a potentiometer. In addition, the computing power of the computer is automatically determined with the aid of a program that runs on the computer, and the input quantity for setting the voice recognition system is specified accordingly. It is thus guaranteed that an automatically adjusted computer guarantees a quality in the voice recognition process that is commensurate with its computing power. A compromise is automatically found between high quality in the voice recognition at the expense of computing power, or respectively, real-time recognition of the language, and rapid voice recognition with a correspondingly low demand for computing power but with significant compromises of the quality of the voice recognition.

Figure 7:
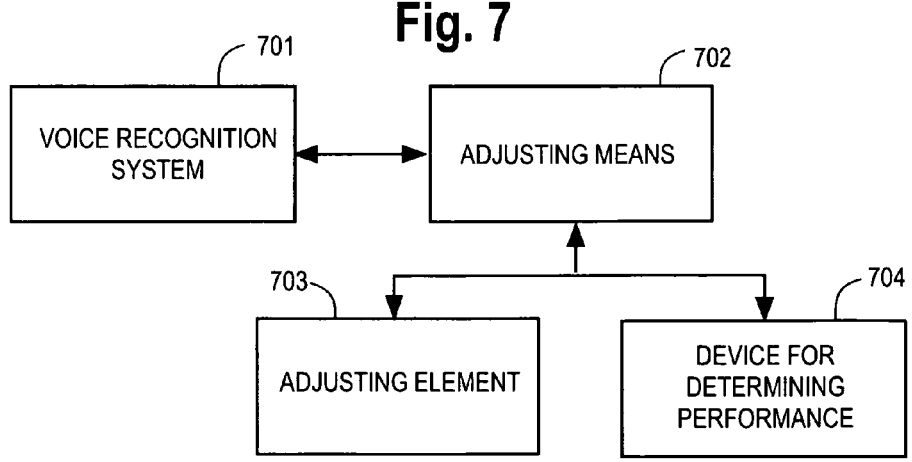
FIG. 7 a voice recognition system with a means for setting the accuracy.

FIG. 7 shows a device consisting of a voice recognition system 701 and a means for adjusting the accuracy of the voice recognition system 702.

System parameters of the voice recognition system are specified by an input quantity using the means for adjusting the accuracy 702. To this end, the input quantity is allocated to a plurality of system parameters (pruning threshold, histogram pruning, acoustic look-ahead, language model look-ahead, threshold for selecting distance parameters to be calculated, etc.), preferably with the aid of a prescribed table.

The input quantity can alternatively be specified using an adjusting element 703 or a device for determining the performance of the computer 704. Refer here to FIG. 6 and the possibilities cited there for setting the input quantity.

Although other modifications and changes may be suggested by those skilled in the art, it is the intention of the inventors to embody within the patent warranted hereon all changes and modifications as reasonably and properly come within the scope of their contribution to the art.

I claim:

1. A method for voice recognition, in which spoken language is recognized using a voice recognition system, comprising the steps of:
   a) running the voice recognition system on a computer;
   b) determining a performance index of the computer by a program for computer performance assessment;
   c) automatically specifying an input quantity for the voice recognition system using the performance index; and
   d) automatically adjusting accuracy of the voice recognition system to an obtained computing power of the computer using the input quantity.

2. A method as claimed in claim 1, further comprising the step of:
   determining values for system parameters of the voice recognition system in that the values are computed from an input quantity in accordance with a mapping specification.

3. A method as claimed in claim 2, further comprising the step of:
   converting the mapping specification using a table.

4. A method as claimed in claim 1, further comprising the step of:
   executing a setting process during operation of the voice recognition system.

5. A method as claimed in claim 1, wherein the accuracy adjusting step of the voice recognition system includes adjustment by at least one of the following system parameters:
   a) pruning threshold;
   b) histogram pruning;
   c) acoustic look-ahead;
   d) language model look-ahead; and
   e) threshold for selecting distance parameters that are to be computed.

6. A method as claimed in claim 5, further comprising the step of:
   specifying at least one of the system parameters using the input quantity.

7. A method as claimed in claim 6, further comprising the step of:
   weighing the system parameters with respect to their influence on a respective target quantity.

8. A method as claimed in claim 7, wherein the target quantity is at least one of the following quantities:
   a) accuracy of the voice recognition system; and
   b) speed of the voice recognition system.

9. A method as claimed in claim 7, further comprising the step of:
   weighting the system parameters equally.

10. A method as claimed in claim 7, further comprising the step of:
    weighting the system parameters according to a prescribed weighting table.

11. An apparatus for voice recognition, comprising:
    a computer; and
    a voice recognition system for recognizing spoken language, the voice recognition system being run on the computer;
    wherein a performance index of the computer is determined by a program for computer performance assessment, an input quantity for the voice recognition system is automatically specified using the performance index, and an accuracy of the voice recognition system is automatically adjusted to an obtained computing power of the computer using the input quantity.

* * * * *